United States Patent
Danneker et al.

(10) Patent No.: US 8,205,574 B2
(45) Date of Patent: Jun. 26, 2012

(54) TEAT CUP HANDLING DEVICE AND A STORING DEVICE FOR TEAT CUPS

(75) Inventors: Gert Danneker, Grodinge (SE); Thomas Axelsson, Farsta (SE)

(73) Assignee: DeLaval Holding AB, Tumba (SE)

( * ) Notice: Subject to any disclaimer, the term of this patent is extended or adjusted under 35 U.S.C. 154(b) by 199 days.

(21) Appl. No.: 12/532,659

(22) PCT Filed: Mar. 13, 2008

(86) PCT No.: PCT/SE2008/050283
§ 371 (c)(1),
(2), (4) Date: Oct. 20, 2009

(87) PCT Pub. No.: WO2008/118069
PCT Pub. Date: Oct. 2, 2008

(65) Prior Publication Data
US 2010/0058990 A1    Mar. 11, 2010

(30) Foreign Application Priority Data
Mar. 23, 2007   (SE) ........................ 0700730

(51) Int. Cl.
*A01J 5/017*   (2006.01)
*A01J 5/00*    (2006.01)
(52) U.S. Cl. ................... 119/14.47; 119/14.1
(58) Field of Classification Search ............ 119/14.08, 119/14.18, 14.47, 14.43, 14.1; *A01J 5/00, A01J 5/17, 5/14*
See application file for complete search history.

(56) References Cited

U.S. PATENT DOCUMENTS

| 3,040,755 A | 6/1962 | Sigmon et al. | |
| 5,842,436 A * | 12/1998 | van der Lely | 119/14.08 |
| 6,044,793 A * | 4/2000 | van der Lely | 119/14.03 |
| 6,213,051 B1 * | 4/2001 | Fransen | 119/14.08 |
| 2005/0274327 A1 | 12/2005 | Johnsson et al. | |

FOREIGN PATENT DOCUMENTS

| AU | 560 697 | 4/1987 |
| EP | 0 900 522 | 3/1999 |
| WO | 99/66786 | 12/1999 |
| WO | 00/04766 | 2/2000 |
| WO | 02/15676 | 2/2002 |
| WO | 2005/122753 | 12/2005 |

OTHER PUBLICATIONS

International Search Report dated Jun. 17, 2008, from corresponding PCT application.

* cited by examiner

*Primary Examiner* — Son T Nguyen
*Assistant Examiner* — Kathleen Iwasaki
(74) *Attorney, Agent, or Firm* — Young & Thompson

(57) ABSTRACT

A teat cup handling device (1) for a robot arm is adapted to attach teat cups to a milking animal. Each teat cup (2) has a centrally located longitudinal axis (2c) extending through a first end surface (2a) of the teat cups provided with a recess for receiving a teat of a milking animal and a oppositely located second end surface (2b) of the teat cups and wherein the teat cup handling device (1) includes at least two holding parts (4) arranged to releasably hold the teat cups (2). Each holding part (4) includes holding elements (9a) adapted to hold the teat cups (2) in positions such that the longitudinal axes (2c) of the teat cups are inclined in relation to each other.

30 Claims, 8 Drawing Sheets

TEAT CUP HANDLING DEVICE AND A STORING DEVICE FOR TEAT CUPS

BACKGROUND OF THE INVENTION AND PRIOR ART

The present invention relates to a teat cup handling device for a robot arm adapted to attach teat cups to a milking animal, wherein each teat cup has a centrally located longitudinal axis extending through a first end surface of the teat cups provided with a recess for receiving a teat of a milking animal and a oppositely located second end surface of the teat cups, and wherein the teat cup handling device comprises at least two holding parts arranged to releasably hold the teat cups. The present invention also relates to a storing device for teat cups to be used together with the teat cup handling device.

One way to fetch and attach teat cups to a milking animal is to use a milking robot comprising a robot arm provided with a gripping device for gripping one teat cup at a time parked in a teat cup storing device. The gripping device fetches and attaches the teat cups in proper order to the teats of the animal. Such an attachment procedure of the teat cups is relatively time-consuming. The attachment procedure of the teat cups constitutes a relative large part of the total time for milking an animal.

WO 00/04766 shows an apparatus for automatic milking of animals. In one embodiment of this invention, the robot arm comprises an end portion for releasably storing and attaching four teat cups. The end portion holds the teat cups in parallel in relation to each other and at different height levels. When a milking process has to be performed, the robot arm moves the end portion from a storing position to an attaching position and attaches the respective teat cups to the teats of the animal. When the milking process has been finished, the teat cups are individually detached from the respective teats of the animal and moved back to the end portion by means of e.g. a cord.

WO 2005/122753 shows a gripper device mountable on a robot arm. The gripper device comprises an electromagnet for gripping teat cups to be attached to the teats of a milking animal. In one embodiment of this invention, the gripper device is provided with several electromagnets. This gripper device is able to fetch multiple teat cups arranged in parallel from a rack and move them towards the teats of a cow to be milked.

SUMMARY OF THE INVENTION

The object of the present invention is to provide a teat cup handling device and a storing device for teat cups, which provide a quick and reliable attachment of the teat cups to the teats of an animal such that the total time for the milking process of an animal can be reduced.

This object is obtained according to the invention by the feature that each holding part comprises holding means adapted to hold the teat cups in positions such that the longitudinal axes of the teat cups are inclined in relation to each other. By such a positioning of the teat cups, it is possible to find at least one attaching position of the teat cup handling device in which one of the teat cups is located at a higher level than the other teat cups. Thereby, it is possible to attach this teat cup to a first teat of the animal without that the remaining teat cups come in contact with the other teats or the udder of the animal. When the first teat cup has been attached to the first teat of the milking animal, the robot arm moves the teat cup handling device to a new attaching position such that a second teat cup obtains a position at a higher level than the remaining teat cups and be attached to a second teat of the animal. In such a manner, it is possible to attach all gripped teat cups in proper order to the teats of an animal. Said holding means may be adapted to hold the teat cups in positions such that an extension of the longitudinal axes of the teat cups are inclined in relation to each other such that an extension of the respective longitudinal axes of the teat cups cross each other in a common point.

According to a preferred embodiment of the invention, said holding means is adapted to hold the teat cups in positions such that the first end surfaces of the respective teat cups are located at a larger distance from each other than the second end surfaces of the teat cups. The arrangement of the first end surfaces of the respective teat cups at a relatively long distance from each other makes it easier to prevent that the first end surfaces of adjacent teat cups come in contact with the teats or the udder of an animal during an attaching process of a teat cup. Furthermore, the risk that the first end surfaces of the adjacent teat cups will be contaminated, during the attaching process, is reduced. The arrangement of the second end surfaces of the respective teat cups at a shorter distance from each other makes it possible to give the teat cup handling device a relatively compact construction.

According to a further embodiment of the invention, the teat cup handling device comprises at least three holding parts arranged at different positions along a curved path. The teat cups may here be moved in proper order along the path to a teat cup attaching position. The necessary motion of the respective holding parts to the attaching position along such a path can be performed in a relatively quick and simple manner.

Preferably, corresponding portions of the respective holding parts are located at substantially the same distance from an axis extending through a center of curvature of the path. Thereby, the path may be at least a part of a circular path such that the respective holding parts can be moved to the attaching position by means of a rotary motion of the teat cup handling device. Such a rotary motion of the teat cup handling device may be performed around a suitable rotation axis of the robot arm. Alternatively, the holding parts may by included in a unit of the teat cup handling device which is rotatably arranged around such an axis. In this case, the teat cup handling device comprises the rotation axis around, which the holding parts with the teat cups will be rotated when the respective teat cups are moved to an attaching position. Said teat cup handling device is adapted to be positioned in a teat cup attaching position with its axis is inclined in relation to a vertical axis. Thereby, the holding parts will be arranged in different positions along an inclined circular path when the teat cup handling device is in a teat cup attaching position. The holding parts and the teat cups not in the attaching position will here be arranged at lower levels along the inclined path.

According to a further embodiment of the invention, the fastening means of the holding parts are adapted to grip the teat cups in the storing device i.e. substantially simultaneously. Thereby, the gripping time for the teat cups may be reduced in an optimal manner. The teat cup handling device may be adapted to fetch the teat cups from different storing positions in a storing device. Said fastening means may comprise an electromagnet which is adapted to releasably grip a surface of a magnetic material of a teat cup. The electromagnet may include a coil feedable with a current and a core of a magnetic material. Alternatively, said fastening means may comprise a suction member which is adapted to releasably grip a surface of a teat cup. The suction member may be connected to a vacuum source creating a negative pressure in the suction member such that it can releasably grip a teat cup. The fastening means may comprise a clamping device or any kinds of device which is able to releasably grip a teat cup. Preferably, said holding means comprises a design with at least one contact surface adapted to come in contact with a correspondingly shaped surface of a teat cup for holding the teat cup in a predetermined position. With such a design of the holding parts, it is ensured that the teat cups are held in predetermined position in relation to each other.

According to a further embodiment of the invention, the teat cup handling device comprises detecting means for detecting the position of the teats of the milking animals. Alternatively, the detecting means can be located on the robot arm in a position in the vicinity of the teat cup handling device. The detecting means may comprise a camera. The camera records images of at least one teat during an attaching process, which are sent to a control unit comprising image analysing means. The control unit controls the movements of the robot arm and the teat cup handling device such that the teat cups being attached to the teats. Preferably, the detecting means is movably arranged in relation to the holding parts. The detecting means may be rotatably arranged in relation to the holding parts. A certain mobility between the detecting means and the holding parts with the teat cups is many times necessary in order to obtain an optimal detection of the respective teats during the attaching process. However, it is possible to use other kinds of detecting means than a camera such as, for example, a detecting member using laser beams.

The teat cup handling device may comprise connection means for enabling a releasable connection between the teat cup handling device and the robot arm. Such a teat cup handling device can be mounted and dismounted on a robot arm in a relatively simple manner.

The above mentioned object is also obtained by a storing device for teat cups to be used together with the teat cup handling device wherein storing device comprises positioning means adapted to hold the parked teat cups in storing positions such that the longitudinal axes of the teat cups are inclined in relation to each other. By giving the teat cups an inclination related to the inclination of the respective holding parts, it is possible to grip all teat cups at the same time by means of the holding parts. Thereby, the time for gripping the teat cups in the storing device will be reduced in an optimal manner. The positioning means may be adapted to hold the parked teat cups in storing positions such that the longitudinal axes of the teat cups are inclined in relation to each other such that an extension of the respective longitudinal axes of the teat cups cross each other in a common point.

According to a further embodiment of the invention, said positioning means is adapted to hold the parked teat cups in storing positions such that the first end surfaces of the teat cups are located at a larger distance from each other than the second end surfaces of the teat cups. Thereby, it is possible to move the teat cup handling device through the relatively large space between the first end surfaces of the teat cups on its way to a position for gripping the teat cups. Preferably, the holding parts are adapted to holding parts of the teat cups located at a smaller distance from each other than the first end surfaces. Advantageously, said positioning means is adapted to hold the parked teat cups in storing positions such the first end surfaces of the teat cups is located at a lower level than the second end surfaces of the teat cups. In these storing positions, the openings of the recesses of the respective teat cups are directed downwardly. As a consequence, possible remaining cleaning liquid or milk in the recesses of the teat cups will flow out through the downwardly directed openings.

According to a further embodiment of the invention, said positioning means comprises parking surfaces adapted to cooperate with the second end surface of teat cups for holding the teat cups in the storing position. By providing the parking surfaces with suitable inclinations, it is possible to give the respective teat cups predetermined inclinations in relation to each other. The storing device may comprise at least three parking surfaces arranged in different positions along a curved path. Preferably, the parking surfaces are arranged in a manner such that the holding parts of the teat cup handling device may simultaneously grip the teat cups from the storing positions in the storing device. The parking surfaces may be located at substantially the same distance from an axis extending through a center of curvature of the path. In such a manner, the parking surfaces are located in different position along at least a part of a circular path around said axis. The axis may be a vertical axis. Said positioning means may comprise a retracting device adapted to supply a pulling force in a milk conduit of at least one teat cup in order to hold the second end surface of teat cup against the parking surfaces with a pressure. Alternatively, the teat cup handling device is adapted to grip and move the teat cups back to their respective storing positions when a milking process has been finished. In such manners, it is ensured that the teat cup obtains a predetermined storing position in the storing device.

According to a further embodiment of the invention, said positioning means comprises a flexible element adapted to hold the teat cups in the storing positions by means of a resilient force. By the use of such a flexible element, it is possible for the holding parts to provide a small displacement of the teat cups in a direction against the resilient action of the elastic element. Thereby, the teat cups are pressed with force against the holding parts, which facilitates the gripping of the teats cups. The flexible element may comprise an annular element adapted to be arranged around the teat cups when they are parked in the storing positions. Thereby, it is possible to insert the holding parts between the inclined teat cups and provide a small displacement of the teat cups in an outwardly direction against the resilient action of the annular element.

BRIEF DESCRIPTION OF THE DRAWINGS

In the following, preferred embodiments of the invention are described by examples and with references to the attached drawings, in which.

BRIEF DESCRIPTION OF PREFERRED EMBODIMENTS OF THE INVENTION

Figure 1:
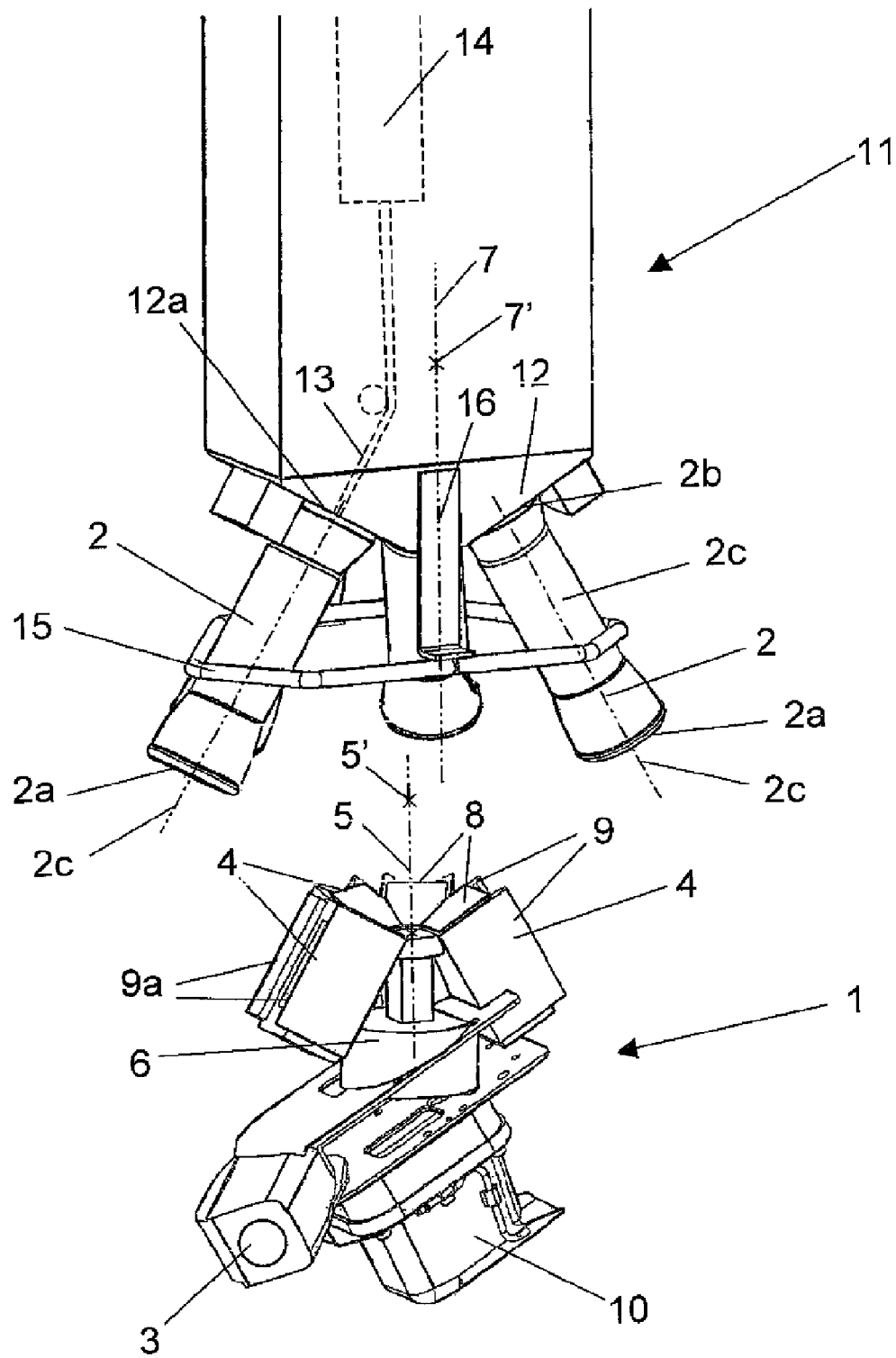
FIGS. 1-3 show a first embodiment of a grip device arranged in different position during a gripping process of four teat cups parked in a storing device.

The FIG. 1 shows a teat cup handling device in the form of a gripping device 1 adapted to be connected to a robot arm of a milking robot which is adapted to automatically attach teat cups 2 to the teats of a milking animal. The milking animal may be a milking cow. The teat cups 2 have an elongated substantially cylindrical shape with a first end surface 2a provided with a recess for receiving a teat of a milking animal and an oppositely located second end surface 2b. Each teat cups 2 has a centrally located axis 2c extending centrally through the teat cup 2 and its end surfaces 2a, b. The gripping device 1 comprises connection means 3 for enabling a releasable connection between the gripping device 1 and a portion of the robot arm. The gripping device 1 comprises four substantially identically designed holding parts 4 arranged at different positions along a path extending around a first axis 5. The holding parts 4 are included in a unit 6 rotatably arranged around the first axis 5. The holding parts 4 are arranged at substantially the same distance from the first axis 5. Consequently, the holding parts are arranged along a part of a circular path around the first axis 5.

Each holding part 4 comprises an electromagnet 8 arranged between two side walls 9. A part of an outer surface of the teat cups 2 is made of a magnetic material. Thereby, it is possible to releasably grip a teat cup 2 in the respective holding parts 4 by a fastening means, e.g., the electromagnet 8. The side walls 9 are provided with front contact surfaces 9a adapted to come in contact with a surface of a teat cup 2 when it has been griped by the electromagnet 8. The front surfaces 9a of the respective grip portions 4 have a shape such that they hold a gripped teat cup 2 in a predetermined position. The contact surfaces 9a of the different holding parts 4 are inclined in relation to each other. Thereby, it is possible to hold the teat cups 2 such that the longitudinal axes 2c of all teat cups 2 are inclined in relation to each other. In this case, the teat cups 2 are adapted to be held in positions such that the longitudinal axes 2c of the teat cups 2 are inclined in relation to each other such that the an extension of the respective longitudinal axis 2c of the teat cups 2 cross each other in a common point 5' on the first axis 5. Furthermore, the gripping device 1 comprises a camera 10 adapted to detect the position of a teat of a milking animal and a teat cup during an attaching process of the teat cup 2 to the teat. Alternatively, said fastening means may comprise a suction member (8) which is adapted to releasably grip a surface of a teat cup. The suction member (8) may be connected to a vacuum source creating a negative pressure in the suction member such that it can releasably grip a teat cup.

FIG. 1 shows the teat cups 2 when they are parked in storing positions in a storing device 11. The storing device 11 comprises a box like structure. A plate member 12 is arranged at a bottom part of the box like structure. The plate member 12 can be elastically suspended in the box like structure. Alternatively, the plate member 12 can be made of an elastic material. The plate member 12 is provided with four parking surface 12a having a specific inclination. Each of the parking surface 12a is adapted to receive a second end surface 2b of a teat cup 2. The parking surfaces are directed downwards such that, the first end surfaces 2a of the teat cups is located at a lower level than the second end surfaces 2b of the teat cups in the storing positions.

A milk conduit 13 and a not disclosed pulsation conduit are connected to the second end surface 2b of the respective teat cups 2. Each parking surface 12a is provided with a through hole for the milk conduit 13 and the pulsation conduit. The four parking surfaces 12a are arranged in different positions along a curved path around a second axis 7 having a vertical extension through a centre portion of the plate member 12. The parking surfaces 12a are located at substantially the same distance from the second axis 7, which extends through a center of curvature of the path. Consequently, the parking surfaces 12a are arranged along a part of a circular path around the vertical axis 7. The parked teat cups 2 is here held in storing positions such that the longitudinal axes 2c of the teat cups 2 are inclined in relation to each other such that the an extension of the respective longitudinal axis 2c of the teat cups 2 cross each other in a common point 7' on the vertical axis 7.

A schematically disclosed retraction device in the form several retraction cylinders 14 are arranged inside the box like structure of the storing device 11. One retraction cylinder 14 for each teat cup 2 may be used. However, only one retracting cylinder 14 is shown in FIG. 1. The retraction cylinders 14 are adapted to provide a pulling force in the milk conduits 13, when a milking process has been finished, such the teat cups 2 are removed from the teats of a milking animal and retracted to the storing device 11. Another object of the retraction devices 14 are to supply a pulling force on the milk conduits 13, when the teat cups 2 are in the storing position in the storing device 11. Thereby, the second end surfaces 2b of the teat cups 2 are pressed against the respective parking surfaces 12a with a suitable force ensuring that the teat cups 2 obtains a desired inclination in the storing positions. The parking surfaces 12a are inclined in relation to each other such that the longitudinal axes 2c of the teat cups 2 diverge in relation to each other in a direction from the second end surfaces 2b to the first end surfaces 2a of the teat cups. Thereby, a relatively large empty space is arisen between the lower first end surfaces 2a of the teat cups than between the upper second end 2b of the teat cups. An annular elastic element 15 is arranged around the teat cups 2 when they are in the storing positions. A lower end portion of two suspension members 16 is adapted to hold the annular elastic element 15 in a predetermined position around the teat cups 2. An upper end portion of the respective suspension members 16 is fixedly attached to the box like structure of the storing device 11.

Figure 2:
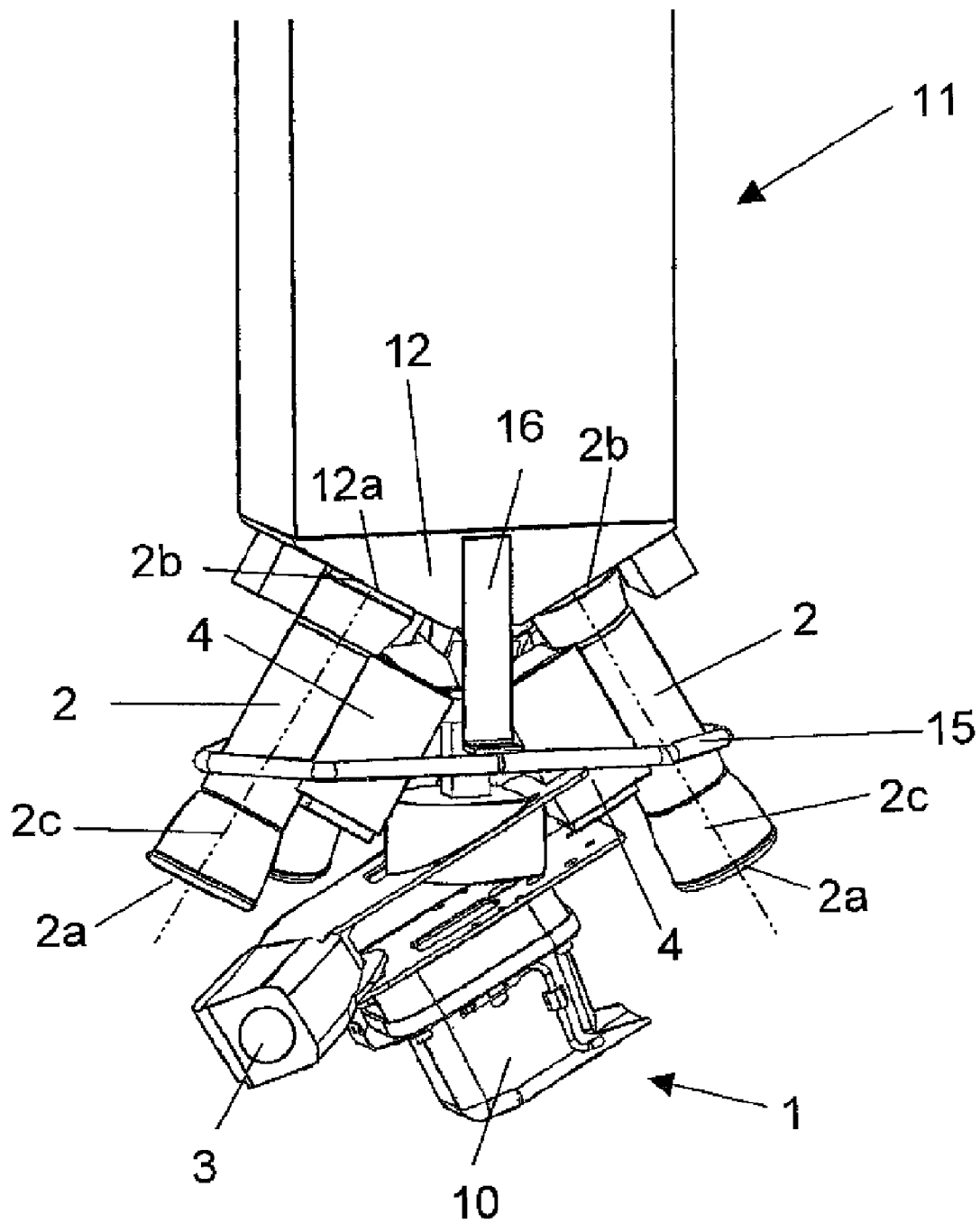
Figure 3:
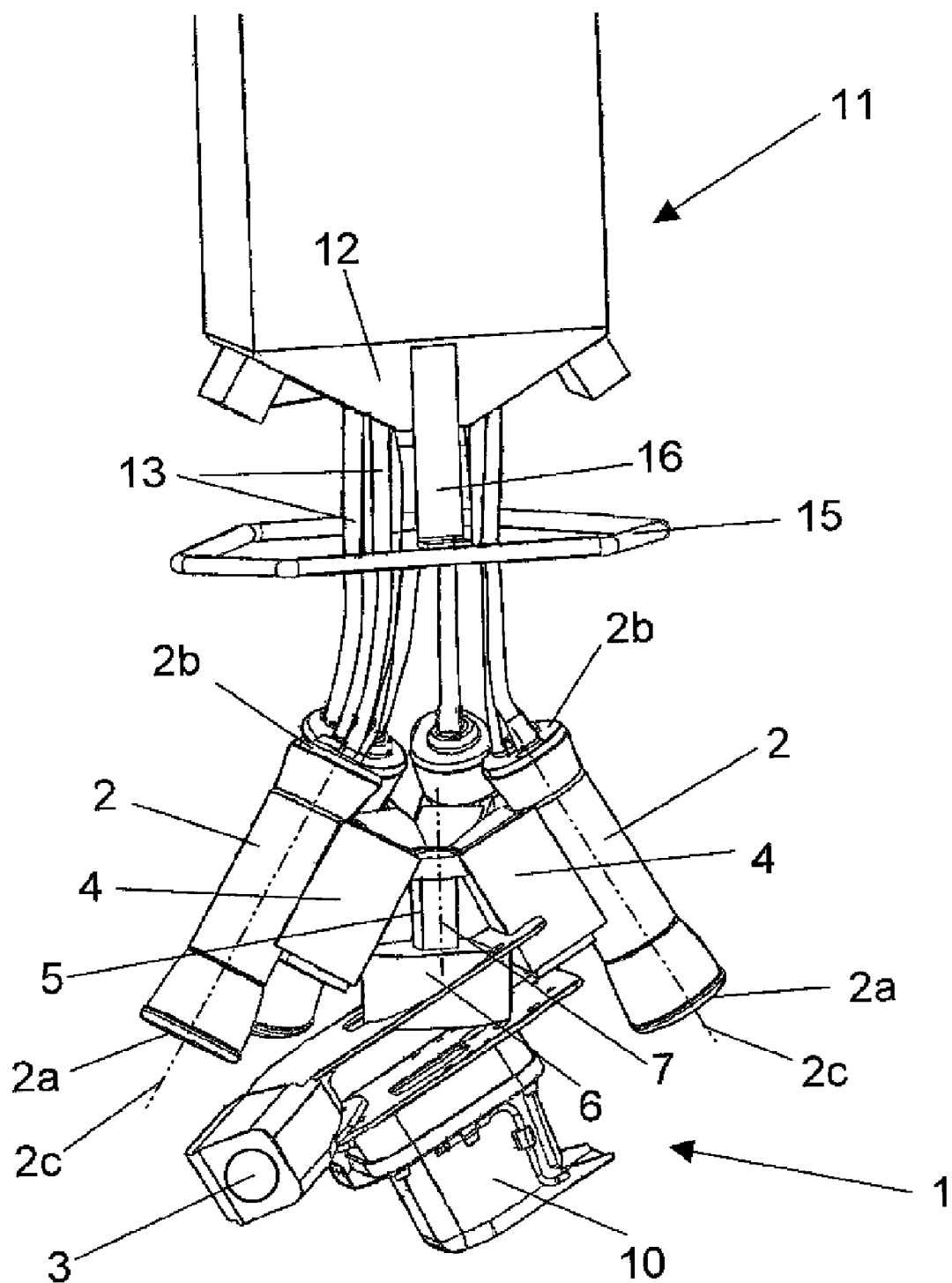

When a milking process has to be performed, the milking robot moves the gripping device 1 to a position below the teat cups 2 which are arranged in storing positions in the storing device 11. The milking robot turns the gripping device 1 such that the holding parts 4 will be located at an upper position of the gripping device 1. Furthermore, the milking robot turns the gripping device 1 around the first axis 5 to a position in which the holding parts 4 are located substantially vertically below a respective teat cup 2 in the storing device 11. FIG. 1 shows the gripping device 1 in this position. The holding parts 4 are arranged at smaller distances from each other than the teat cups 2 in the storing device 11. Thereby, it is possible for the robot arm to lift the gripping device 1 substantially vertically upwards and into the space between the stored teat cups 2. The front surfaces 9a of the holding parts 4 have a somewhat larger inclination in relation to a horizontal plane than the inclination of the outer surfaces of the parked teat cups 2. Consequently, when the holding parts 4 come in contact with the respective teat cup 2, the front surfaces 9a of the holding parts 4 displaces the respective teat cups 2 somewhat outwardly against the resilient action of the elastic element 15 until the contact surfaces of the teat cups 2 exactly has the same inclination as the front surfaces 9a of the holding parts 4. In this state, the elastic element 15 presses the teat cups 2 against the electromagnets 8 of the holding parts 4 with a resilient force. The electromagnets 8 are activated and the respective holding parts 4, which are shown in FIG. 2, grip the teat cups 2 simultaneously. The robot arm moves the gripping device 1 vertically downwardly with the gripped teat cups 2 to a position shown in FIG. 3. During this motion, the milk conduits 13 and pulsation conduits are pulled out from the box like structure of the storing device 11.

Figure 4:
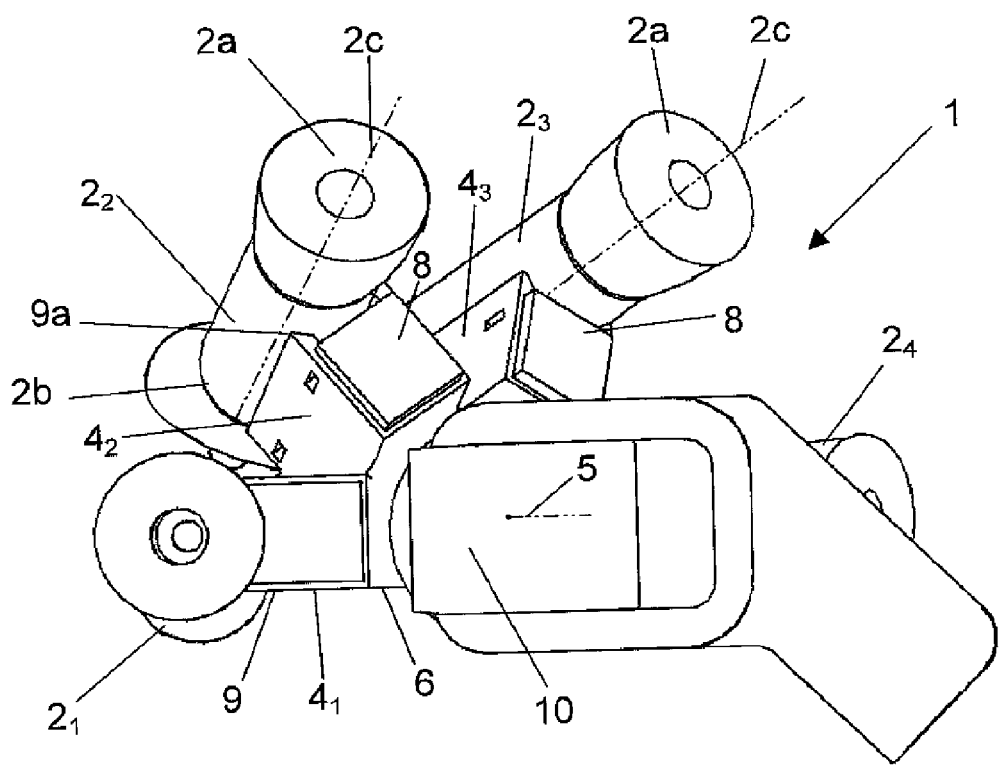
FIG. 4 shows a view from the above of the grip device in FIG. 1 and FIGS. 5-8 show a second embodiment of a grip device during the attaching processes of teat cups to the teats of an animal.

The milking robot turns the gripping device 1 such that the holding parts 4 obtain a lower position of the gripping device 1 and the camera 10 an upper position of the gripping device 1. Thereafter, the milking robot moves the gripping device 1 to a teat cup attaching position below the teats of a milking animal. FIG. 4 shows the gripping device 1 in this teat cup attaching position from the above. In this position, the camera 10 is able to detect the first teat of the milking animal and a first holding part $4_1$ holds a first teat cup $2_1$ in a position in front of the camera 10. As described above, the holding parts 4 is arranged on a unit 6 which is rotatably arranged around an axis 5 in relation to the remaining part of the gripping device 1. However, the axis 5 has an inclination in relation to a vertical axis, in the teat cup attaching position, such that the first teat cup $2_1$ is located at a higher level than the remaining teat cups $2_{2-4}$. The remaining teat cups $2_{2-4}$ are arranged in successively lower positions along a part of a circular path having an extension of substantially 180° around the axis 5. When the first teat cup $2_1$ has been attached to a first teat of the milking animal, the unit 6 is rotated around the axis 5 about 60° such that the second teat cup $2_2$ enters to a teat cup attaching position in front of the camera 10 before the second teat cup is attached to a second teat of the milking animal. In a corresponding manner, the third and fourth teat cups $2_{3-4}$ are successively rotated to a teat cup attaching position in front of the camera 10 before they are attached to a third and fourth teat of the milking animal.

Figure 5:
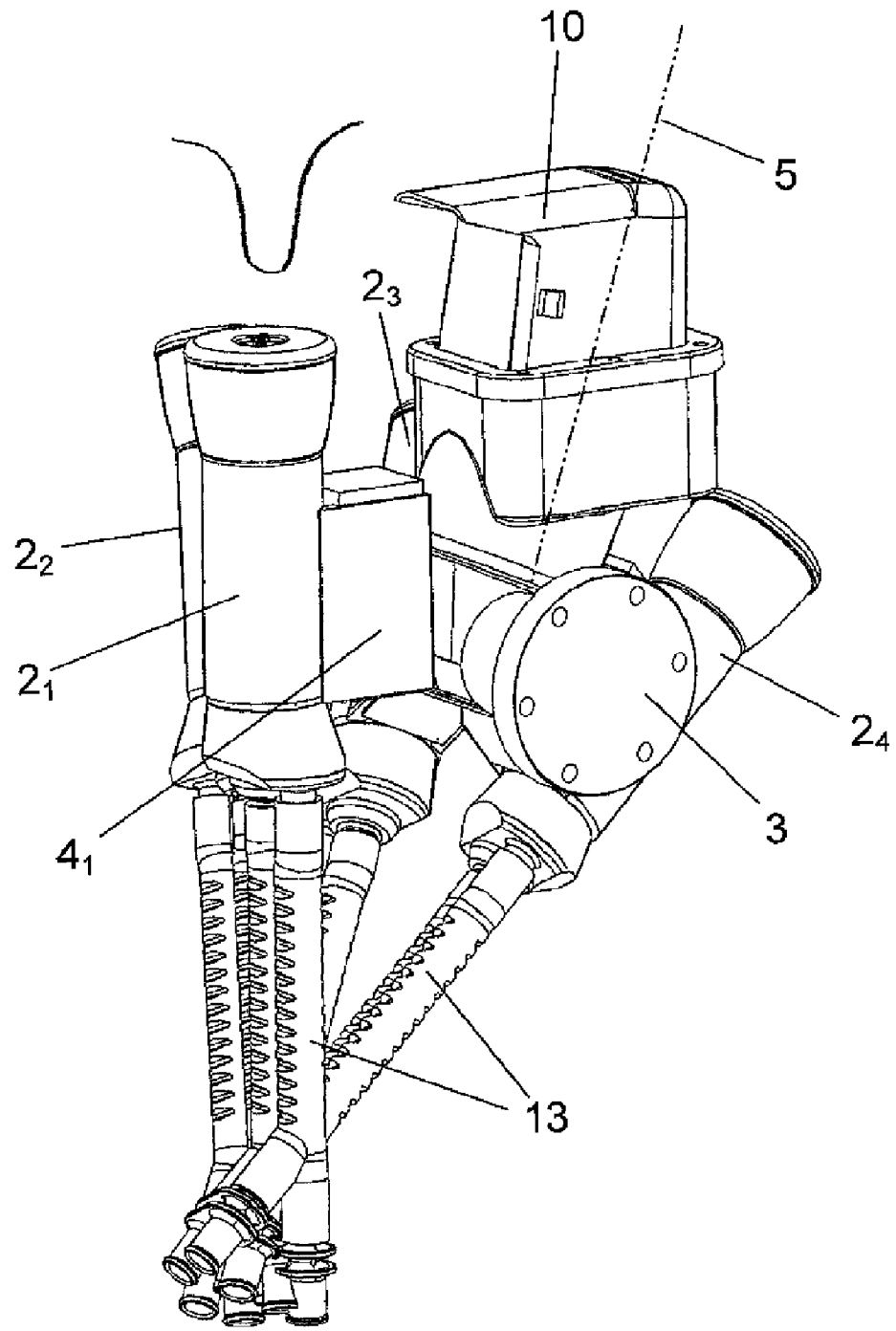

FIG. 5 shows another embodiment of the gripping device 1. In this case, the gripping device 1 comprises an attachment plate 3 for releasably mounting of a robot arm. The gripping device 1 has here been positioned in a teat cup attaching position by the robot arm. A first holding part $4_1$ with a first teat cup $2_1$ is here arranged below a first teat of a milking animal. I this position, the first teat and the first teat cup $2_1$ is in a position in front of the camera 10. Four holding parts 4 are arranged on different positions along a part of a circular path extending around an axis 5. The axis 5 has an inclination in relation to a vertical axis in the teat cup attaching position such that the first teat cup $2_1$ is located at a higher level than the remaining teat cups $2_{2-4}$. The remaining teat cups $2_{2-4}$ are arranged in successively lower positions along the path having an extension of substantially 180° around the axis 5. The camera 10 records images of the first teat. The images are sent to a control unit comprising image analysing means. By means of these images, the control unit controls the motion of the robot arm such that the first teat cup $2_1$ is attached to the first teat.

Figure 6:
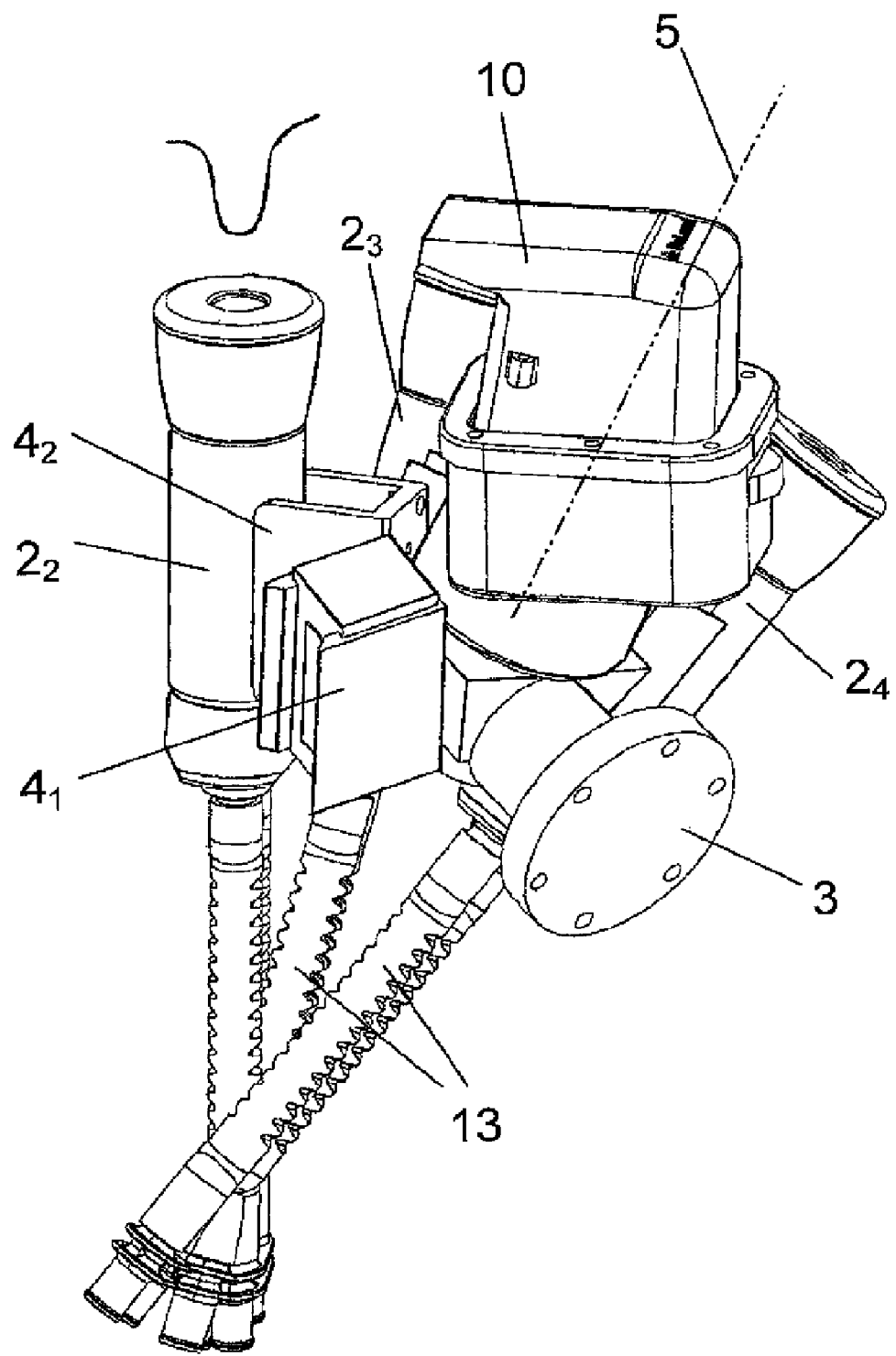
Figure 7:
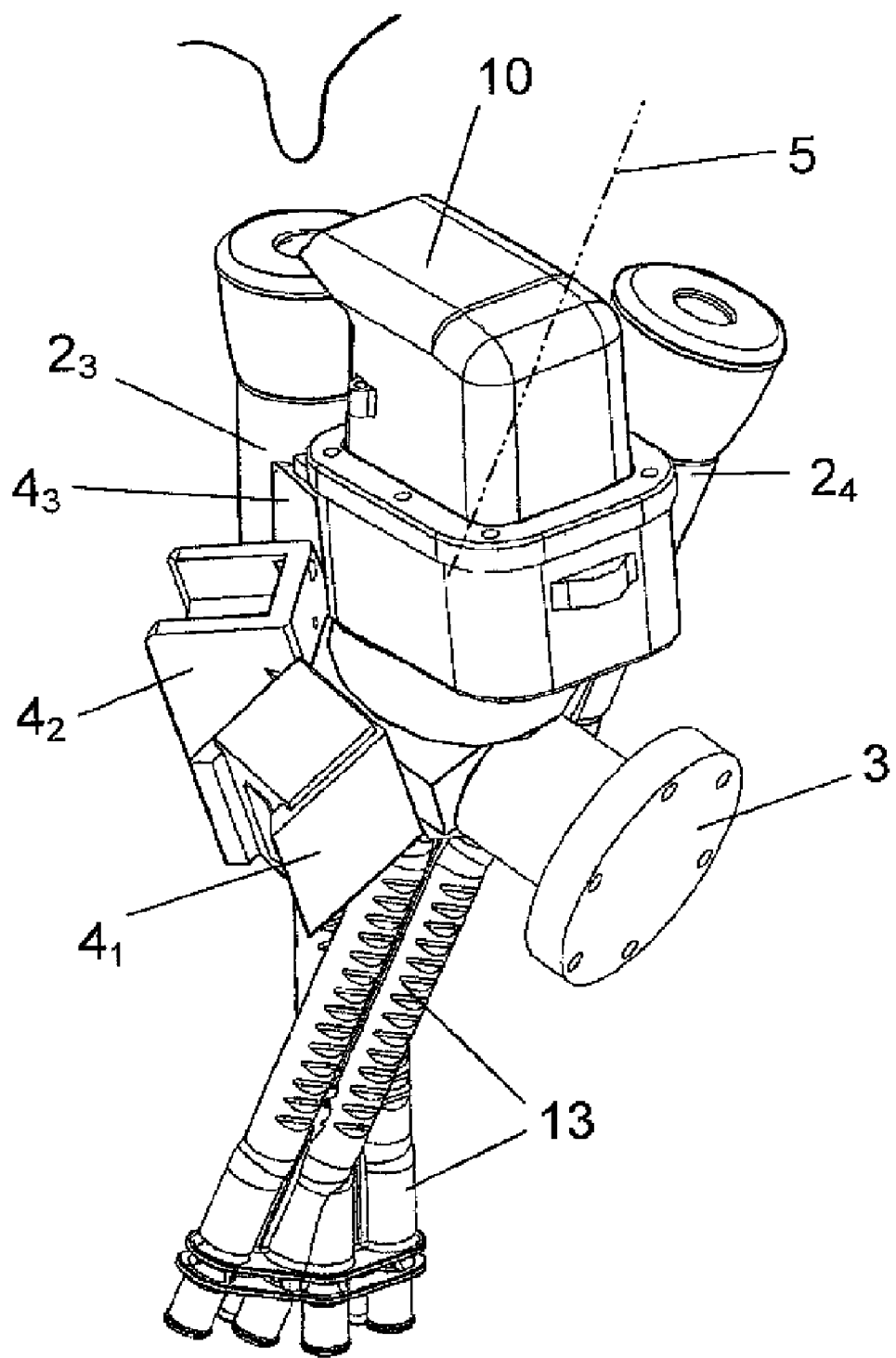
Figure 8:
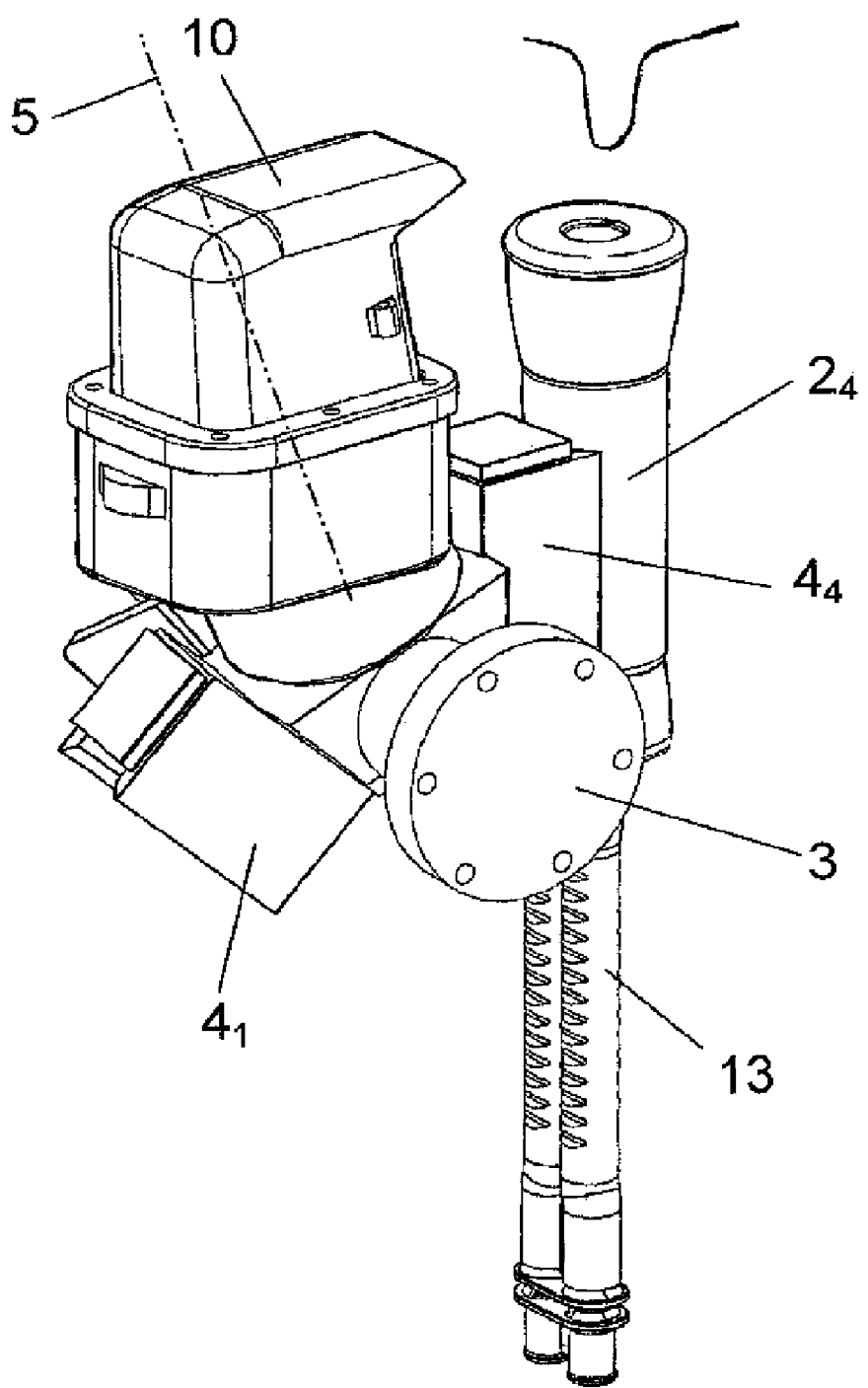

When the first teat cup $2_1$ has been attached to the first teat of the milking animal, the robot arm moves and turns the gripping device 1 such that the second holding part $4_2$ with the second teat cup $2_2$ is moved to a teat cup attaching position, which is shown in FIG. 6. In this embodiment of the grip device 1, the camera 10 is rotatably arranged around the inclined axis 5 instead of the holding parts 4. Consequently, the camera 10 has here been turned to a new position for recording images of a second teat. When the second teat cup $2_2$ has been attached to the second teat of the milking animal, the robot arm moves and turns the gripping device 1 such that the third holding part $4_3$ with the third teat cup $2_3$ is moved to a teat cup attaching position, which is shown in FIG. 7. The camera 10 has here been rotated around the axis 5 in order to be in an optimal position for recording images of a third teat. Finally, the fourth teat cup $2_4$ is attached to the fourth teat of the milking animal in a corresponding manner, which is shown in FIG. 8. When the milking process has been finished the teat cups 2 are removed from the teat and pulled by means of the retracting cylinders 14 back to the storing positions in the storing device 11.

The invention is not limited to the described embodiments but may be varied and modified freely within the scope of the claims.

The invention claimed is:

1. A teat cup handling device for a robot arm adapted to attach teat cups to teats of a milking animal, wherein in use, the teat cup handling device i) grips teat cups stored in a teat cup storing device, the teat cup storing device being separated and spaced apart from the robot arm, ii) fetches the gripped teat cups from the storing device, and iii) attaches the fetched teat cups to the teats of the milking animal, the teat cup handling device comprising:
   a first axis (5), and four teat cup holding parts (4) arranged around the first axis (5), the four holding parts (4) arranged at different positions along a curved path extending around the first axis (5),
   each holding part (4) comprising a holding unit (9) with a contact surface (9a) for releasably holding a respective teat cup (2) on the contact surface (9a),
   the contact surface (9a) of each holding unit (9) being inclined in relation to the contact surface (9a) of each of the other holding units (9),
   wherein each teat cup (2) has an elongated substantially cylindrical shape with a first end surface (2a) provided with a recess for receiving one teat of the milking animal and an oppositely located second end surface (2b), a centrally located longitudinal axis (2c) extending through the first end surface (2a) and the second end surface (2b),
   wherein, in use, with the teat cups stored in a storing position in the teat cup storing device with the first end surface (2a) oriented downward and the teat cups free of holding by the holding parts, each holding part (4) of the teat cup handling device i) grips and then holds the teat cups stored in the storing position in the teat cup storing device so that the teat cups become gripped and held by the holding parts, ii) fetches the gripped teat cups from the storing device, and iii) attaches the fetched teat cups to the teats of the milking animal with milk conduits (13) of the teat cups extending back to the teat cup storing device, and
   wherein, in use, in fetching the gripped teat cups from the storing device, the contact surfaces (9a) of the holding units (9) hold the teat cups (2) such that i) the longitudinal axis (2c) of each teat cup is inclined in relation to the longitudinal axes (2c) of all other teat cups (2), and ii) an extension of the respective longitudinal axis (2c) of the teat cups (2) simultaneously all cross each other in a common point (5').

2. A teat cup handling device according to claim 1, wherein,
   said teat cup handling device is adapted to simultaneously grip and then hold the four teat cups stored in the storing position in a teat cup magazine, and
   said holding part (9) is adapted to simultaneously hold the four teat cups (2) in positions such that the first end surfaces (2a) of the respective teat cups are located at a larger distance from each other than the second end surfaces (2b) of the teat cups.

3. A teat cup handling device according to claim 1, wherein,
   the extension of the respective longitudinal axis (2c) of the teat cups (2) simultaneously all cross each other in the common point (5') on the first axis (5),
   the curved path defines a circle, and
   corresponding portions of the respective holding parts (4) are located at substantially the same distance from said first axis (5) extending through a center of curvature of the curved path.

4. A teat cup handling device according to claim 3, wherein the holding parts (4) are included in a unit (6) which is rotatably arranged around said first axis (5).

5. A teat cup handling device according to claim 4, wherein said teat cup handling device is adapted to be positioned in a teat cup attaching position when said first axis (5) is inclined in relation to a vertical axis.

6. A teat cup handling device according to claim 1, wherein the teat cups (2) are adapted to be moved one at a time along the path to a teat cup attaching position.

7. A teat cup handling device according to claim 1, wherein the teat cup handling device is adapted to fetch the teat cups (2) from different storing positions in the storing device (11).

8. A teat cup handling device according to claim 7, wherein the holding parts (4) comprises fastening means (8) adapted to simultaneously grip the teat cups (2) in the storing device (11).

9. A teat cup handling device according to claim 8, wherein said fastening means comprises an electromagnet (8) adapted to releasably grip a surface of a magnetic material of a teat cup (2).

10. A teat cup handling device according to claim 8, wherein said fastening means comprises a suction member adapted to releasably grip a surface of a teat cup (2).

11. A teat cup handling device according to claim 1, wherein said contact surface (9a) has a shape corresponding to a correspondingly shaped surface of a teat cup (2) for holding the teat cup in a predetermined position.

12. A teat cup handling device according to claim 1, wherein the teat cup handling device comprises detecting means (10) for detecting the position of the teats of the milking animals.

13. A teat cup handling device according to claim 12, wherein said detecting means comprises a camera (10).

14. A teat cup handling device according to claim 12, wherein said detection means (10) is movably arranged in relation to the holding parts (4).

15. A teat cup handling device according to claim 14, wherein said detection means (10) is rotatably arranged in relation to the holding parts (4).

16. A teat cup handling device according to claim 1, wherein the teat cup handling device comprises connection means (3) for enabling a releasable connection between the teat cup handling device (1) and the robot arm.

17. A teat cup handling device according to claim 1, wherein the common point (5') is located on said first axis (5).

18. A storing device for storing teat cups in combination with a teat cup handling device, the teat cup handling device for a robot arm adapted to attach teat cups to teats of a milking animal, wherein in use, the teat cup handling device i) grips teat cups stored in the storing device, the teat cup storing device being separated and spaced apart from the robot arm, ii) fetches the gripped teat cups from the storing device, and iii) attaches the fetched teat cups to the teats of the milking animal, the teat cup handling device comprising:

a gripping device (1) having a first axis (5), a connection (3) for connection to a robot arm of a milking robot, and four teat cup holding parts (4) arranged around the first axis (5), the four holding parts (4) arranged at different positions along a curved path extending around the first axis (5), each holding part (4) comprising a holding unit (9) with a contact surface (9a) for releasably holding a respective teat cup (2) on the contact surface (9a), the contact surface (9a) of each holding unit (9) being inclined in relation to the contact surface (9a) of each of the other holding units (9), wherein each teat cup (2) has an elongated substantially cylindrical shape with a first end surface (2a) provided with a recess for receiving one teat of the milking animal and an oppositely located second end surface (2b), a centrally located longitudinal axis (2c) extending through the first end surface (2a) and the second end surface (2b), and wherein, in use, in fetching the gripped teat cups from the storing device, the contact surfaces (9a) of the holding units (9) hold the teat cups (2) such that i) the longitudinal axis (2c) of each teat cup is inclined in relation to the longitudinal axes (2c) of all other teat cups (2), and ii) an extension of the respective longitudinal axis (2c) of the teat cups (2) simultaneously all cross each other in a common point (5'), wherein the storing device comprises positioning means adapted to hold at least two parked teat cups (2) in different storing positions, wherein, in use, with the teat cups stored in storing positions in the teat cup storing device with the first end surface (2a) oriented downward and the teat cups free of holding by the holding parts, each holding part (4) of the teat cup handling device i) grips and then holds the teat cups stored in the storing position in the teat cup storing device so that the teat cups become gripped and held by the holding parts, ii) fetches the gripped teat cups from the storing device, and iii) attaches the fetched teat cups to the teats of the milking animal with milk conduits (13) of the teat cups extending back to the teat cup storing device, and wherein the positioning means is adapted to hold the parked teat cups (2) in storing positions such that the longitudinal axes (2c) of the teat cups are inclined in relation to each other.

19. A storing device according to claim 18, wherein said positioning means is adapted to hold the parked teat cups (2) in the storing positions such that the longitudinal axes (2c) of the teat cups are inclined in relation to each other such that an extension of the respective longitudinal axes (2c) of the teat cups cross each other in a common point (7').

20. A storing device according to claim 18, wherein said positioning means is adapted to hold the parked teat cups (2) in the storing positions such that the first end surfaces (2a) of the teat cups are located at a larger distance from each other than the second end surfaces (2b) of the teat cups.

21. A storing device according to claim 18, wherein said positioning means is adapted to hold the parked teat cups (2) in the storing positions such the first end surfaces (2a) of the teat cups is located at a lower level than the second end surfaces (2b) of the teat cups.

22. A storing device according to claim 21, wherein that said positioning means comprises a retracting device (14) adapted to supply a pulling force in a milk conduit of at least one teat cup (2) in order to hold the second end surface (2b) of teat cup against the parking surfaces (12a) with a pressure.

23. A storing device according to claim 18, wherein said positioning means comprises parking surfaces (12a) adapted to cooperate with the second end surface (2b) of teat cups for holding the teat cups in the storing position.

24. A storing device according to claims 23, wherein the storing device comprises at least three parking surfaces (12a) arranged in different positions along a curved path.

25. A storing device according to claim 24, wherein, the extension of the respective longitudinal axis (2c) of the teat cups (2) simultaneously all cross each other in the common point (5') on the first axis (5), the curved path defines a circle, and the parking surfaces (12a) are located at substantially the same distance from an axis (5) extending through a center of curvature of the curved path.

26. A storing device according to claim 18, wherein said positioning means comprises a flexible element (15) adapted to hold the teat cups in the storing positions by means of a resilient force.

27. A storing device according to claim 26, wherein said flexible element comprises an annular element (15) adapted to be arranged around the teat cups (2) when they are parked in the storing positions.

28. A storing device according to claim 18, wherein the common point (5') is located on said first axis (5).

29. A teat cup handling device for a robot arm of a milking robot, the robot arm adapted to attach teat cups to teats of a milking animal, wherein in use, the teat cup handling device i) grips teat cups stored in a teat cup storing device, the teat cup storing device being separated and spaced apart from the robot arm, ii) fetches the gripped teat cups from the teat cup device, and iii) attaches the fetched teat cups to the teats of the milking animal, each teat cup (2) having an elongated substantially cylindrical shape with a first end surface (2a) provided with a recess for receiving one teat of the milking animal and an oppositely located second end surface (2b), a centrally located longitudinal axis (2c) extending through the first end surface (2a) and the second end surface (2b), the teat cup handling device comprising:

a gripping device (1) having a first axis (5), a connection (3) for connection to the robot arm of the milking robot, and four teat cup holding parts (4) arranged at different positions along a curved path extending completely around the first axis (5), each holding part (4) comprising a holding unit (9) configured for releasably gripping and then holding a respective teat cup (2) in a storing position of a teat cup storing device, wherein, in use, with the teat cups stored in the storing position in the teat cup storing device with the first end surface (2a) oriented downward and the teat cups free of holding by the holding parts, each holding part (4) of the teat cup handling device i) grips and then holds the teat cups stored in the retracted storing position in the teat cup storing device so that the teat cups become gripped and held by the holding parts, ii) fetches the gripped teat cups from the storing device, and iii) attaches the fetched teat cups to the teats of the milking animal with milk conduit (13) of the teat cups extending back to the teat cup storing device, each holding unit (9) being inclined in relation to corresponding portions of all of the other holding units (9), wherein, in use, the holding units (9) simultaneously grip all the teat cups (2) such that i) the longitudinal axis (2c) of each teat cup is inclined in relation to the longitudinal axes (2c) of all other teat cups (2), and ii) an extension of the respective longitudinal axis (2c) of the teat cups (2) simultaneously all cross each other in a common point (5').

30. A teat cup handling device according to claim 29, wherein the common point (5') is located on said first axis (5).

* * * * *